US012437436B2

(12) United States Patent
Wang et al.

(10) Patent No.: US 12,437,436 B2
(45) Date of Patent: Oct. 7, 2025

(54) DATA MARKING METHOD, APPARATUS, SYSTEM, DEVICE AND STORAGE MEDIUM (71) Applicant: Beijing Baidu Netcom Science Technology Co., Ltd., Beijing (CN)

(72) Inventors: Lei Wang, Beijing (CN); Ying Wang, Beijing (CN); Xiaoting Zang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/043,705

(22) PCT Filed: Jun. 20, 2022

(86) PCT No.: PCT/CN2022/099883
§ 371 (c)(1),
(2) Date: Mar. 1, 2023

(87) PCT Pub. No.: WO2023/103329
PCT Pub. Date: Jun. 15, 2023

(65) Prior Publication Data
US 2025/0078305 A1 Mar. 6, 2025

(30) Foreign Application Priority Data
Dec. 8, 2021 (CN) .......................... 202111489679.1

(51) Int. Cl.
*G06T 7/70* (2017.01)
(52) U.S. Cl.
CPC ...... *G06T 7/70* (2017.01); *G06T 2207/10016* (2013.01)
(58) Field of Classification Search
None
See application file for complete search history.

(56) References Cited

U.S. PATENT DOCUMENTS

| 2009/0295931 | A1 | 12/2009 | Cho |
| 2018/0179051 | A1 | 6/2018 | Keller et al. |
| 2021/0082128 | A1 | 3/2021 | Okada et al. |

FOREIGN PATENT DOCUMENTS

| CN | 110032914 | 7/2019 | |
| CN | 110032914 A | * 7/2019 | ............. G06T 7/187 |

(Continued)

OTHER PUBLICATIONS

International Search Report issued in corresponding PCT Application No. PCT/CN2022/099883, mailed Sep. 21, 2022.

(Continued)

*Primary Examiner* — Delomia L Gilliard
(74) *Attorney, Agent, or Firm* — NORTON ROSE FULBRIGHT US LLP (57) ABSTRACT

A data marking method, apparatus, system, device, and storage medium are disclosed. A method can include: acquiring multiple pictures whose contents are continuous, wherein the multiple pictures contain at least one same object; for each object, determining a position offset of the object by using position information of the object in two adjacent pictures, wherein the two adjacent pictures include a first previous picture and a second previous picture, the second previous picture is a picture before and adjacent to a picture to be marked in time sequence; the first previous picture is a picture before and adjacent to the second previous picture in time sequence; determining estimated position information of the object in the picture to be marked based on the position information of the second previous picture and the position offset; marking the object in the picture to be marked based on the estimated position information.

13 Claims, 4 Drawing Sheets

(56) References Cited

FOREIGN PATENT DOCUMENTS

| CN | 111860302 | | | 10/2020 | |
|---|---|---|---|---|---|
| CN | 112509015 | | | 3/2021 | |
| CN | 112712051 | A | * | 4/2021 | ............ G06V 10/22 |
| CN | 113034541 | | | 6/2021 | |
| CN | 113034541 | A | * | 6/2021 | |
| CN | 113378958 | | | 9/2021 | |
| CN | 113378958 | A | * | 9/2021 | |
| CN | 113763572 | | | 12/2021 | |
| CN | 114168767 | | | 3/2022 | |
| CN | 115000287 | | | 9/2022 | |
| JP | 2021043940 | | | 3/2021 | |
| JP | 2021073541 | | | 5/2021 | |
| KR | 20190092381 | | | 8/2019 | |
| WO | WO 2018125246 | | | 7/2018 | |
| WO | WO-2022135027 | A1 | * | 6/2022 | ........... G06T 7/0002 |

OTHER PUBLICATIONS

Amer, Aishy et al., "Real-Time Motion Estimation by Object-Matching for High-Level Video Representation." *Proc. IAPR/CIPPRS Int. Conf. on Vision Interface.* 2002, 8 pages.

Extended European Search Report issued in Corresponding European Application No. 22850702.6, dated Apr. 8, 2024.

Ujiie, Takayuki et al., "Interpolation-based Object Detection Using Motion Vectors for Embedded Real-time Tracking Systems" *2018 IEEE/CVF Conference on Computer Vision and Pattern Recognition Workshops*, IEEE, Jun. 18, 2018, 9 pages.

Office Action issued in corresponding Japanese Application No. 2023-508558 issued on Mar. 5, 2024.

\* cited by examiner

DATA MARKING METHOD, APPARATUS, SYSTEM, DEVICE AND STORAGE MEDIUM

CROSS REFERENCE TO RELATED APPLICATIONS

The present application is a national phase application under 35 U.S.C. § 371 of International Application No. PCT/CN2022/099883, filed Jun. 20, 2022, which claims the benefit of priority to Chinese patent application No. 202111489679.1 filed with the China National Intellectual Property Administration on Dec. 8, 2021 and entitled "Data marking method, apparatus, system, device and storage medium", each of which are incorporated herein by reference in their entirety.

TECHNICAL FIELD

The present disclosure relates to the technical field of data processing, in particular to artificial intelligence, big data, deep learning and the like.

BACKGROUND

Data marking is an important process in the field of computer research and application. For example, a model is trained based on a large amount of marked data.

SUMMARY

The present disclosure provides a data marking method, apparatus, system, device and storage medium.

According to a first aspect of the present disclosure, a data marking method is provided, which includes:
  acquiring multiple pictures whose contents are continuous, wherein the multiple pictures contain at least one same object;
  for each object, determining a position offset of the object by using position information of the object in two adjacent pictures, wherein the two adjacent pictures include a first previous picture and a second previous picture, the second previous picture is a picture before and adjacent to a picture to be marked in time sequence; the first previous picture is a picture before and adjacent to the second previous picture in time sequence;
  determining estimated position information of the object in the picture to be marked based on the position information of the second previous picture and the position offset;
  marking the object in the picture to be marked based on the estimated position information.

According to a second aspect of the present disclosure, a data marking apparatus is provided, which includes:
  a first acquiring module, configured for acquiring multiple pictures whose contents are continuous, wherein the multiple pictures contain at least one same object;
  a determining module, configured for: for each object, determining a position offset of the object by using position information of the object in two adjacent pictures, wherein the two adjacent pictures include a first previous picture and a second previous picture, the second previous picture is a picture before and adjacent to a picture to be marked in time sequence; the first previous picture is a picture before and adjacent to the second previous picture in time sequence; determining estimated position information of the object in the picture to be marked based on the position information of the second previous picture and the position offset;
  a marking module, configured for marking the object in the picture to be marked based on the estimated position information.

According to a third aspect of the present disclosure, a data marking system is provided, which includes a marking system back end and a marking system front end;
  wherein the marking system back end is configured for acquiring multiple pictures whose contents are continuous, wherein the multiple pictures contain at least one same object; for each object, determining a position offset of the object by using position information of the object in two adjacent pictures, wherein the two adjacent pictures include a first previous picture and a second previous picture, the second previous picture is a picture before and adjacent to a picture to be marked in time sequence; the first previous picture is a picture before and adjacent to the second previous picture in time sequence; determining estimated position information of the object in the picture to be marked based on the position information of the second previous picture and the position offset; marking the object in the picture to be marked based on the estimated position information;
  the marking system front end is configured for displaying the marking of the object in the image to be marked by the marking system back end.

According to a fourth aspect of the present disclosure, an electronic device is provided, which includes:
  at least one processor; and
  a memory in communication with the at least one processor; wherein
  the memory has stored thereon instructions executable by the at least one processor which, when executed by the at least one processor, cause the at least one processor to execute the method described in the first aspect.

According to a fifth aspect of the present disclosure, a non-transitory computer-readable storage medium having stored computer instructions thereon, wherein the computer instructions are configured to cause the computer to execute the method described in the first aspect.

According to a sixth aspect of the present disclosure, a computer program product including computer programs is provided, which when executed by a processor, cause the processor to execute the method described in the first aspect.

In the present disclosure, the position offset of an object can be determined by using position information of the object in two adjacent pictures, estimated position information of the object in the picture to be marked can be determined based on position information of a second previous picture and the position offset, and the object in the picture to be marked can be marked based on the estimated position information, thereby avoiding marking each object in the picture through human memory, which can speed up the marking of the same object in multiple pictures.

It should be understood that the content described in this part is not intended to identify the key or important features of embodiments of the present disclosure, nor is it used to limit the scope of the present disclosure. Other features of the present disclosure will be readily understood by the following description.

BRIEF DESCRIPTION OF THE DRAWINGS

The accompanying drawings are used to better understand the solution and do not constitute a limitation on the present disclosure. Wherein.

DETAILED DESCRIPTION

In order to make objectives, technical solutions and advantages of the present application more apparent, the present application now will be described in detail with reference to the accompanying drawings and the embodiments. Obviously, the embodiments described are only some of the embodiments of the present application instead of all the embodiments. All other embodiments obtained by those of ordinary skills in the art based on the embodiments herein without any creative efforts are within the scope of the present invention.

The exemplary embodiments of the present disclosure are described below in combination with the accompanying drawings, wherein various details of the embodiments of the present disclosure are included for understanding, and should be considered as merely exemplary. Therefore, those skilled in the art should realize that various changes and modifications can be made on the embodiments described herein without departing from the scope and spirit of the disclosure. Similarly, for clarity and conciseness, the following description omits the description of well-known functions and structures.

In the application of Artificial Intelligence (AI) under the current concept of smart city, marking is needed on the pictures collected by the camera in many scenes. For example, starting to mark an object that enters an imaging range until the object leaves the imaging range can be understood as marking on a picture taken by the camera.

Figure 1:
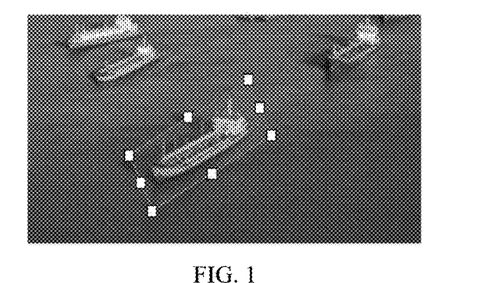
FIG. 1 is a schematic diagram of a box selection in an embodiment of the present disclosure.
Figure 2:
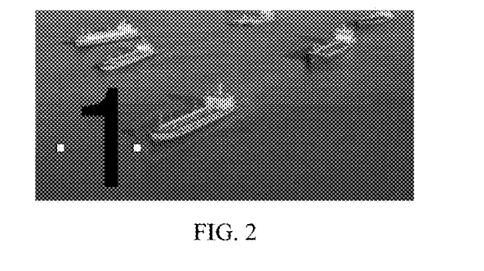
FIG. 2 is a schematic diagram of marking an object identifier in a picture in an embodiment of the present disclosure.

In general, marking is performed by box selection. Different objects, such as ships, vehicles and other objects, are marked with different IDs (identifiers) at the same time of box selection to identify the same object in different images through the same ID. Wherein the box selection refers to marking a maximum coverage of an object in the picture with the object as the center, as shown in FIG. 1, in which a ship is selected by means of a rectangular box. For the ID marking of the object, an ID can be marked near the object. As shown in FIG. 2, the ID of the ship marked in the picture is 1, the position of the ship may change in subsequent pictures, for example, moves downwards and to the left, it is necessary to continue to mark the same ID of 1 as the previous picture for the ship with a changed position.

The data marking method according to the embodiments of the present disclosure can be applied to an electronic device. Specifically, the electronic device can be a terminal, a server, etc.

The embodiment of the present disclosure provides a data marking method, which may include:

acquiring multiple pictures whose contents are continuous, wherein the multiple pictures contain at least one same object;

for each object, determining a position offset of the object by using position information of the object in two adjacent pictures, wherein the two adjacent pictures include a first previous picture and a second previous picture, the second previous picture is a picture before and adjacent to a picture to be marked in time sequence; the first previous picture is a picture before and adjacent to the second previous picture in time sequence;

determining estimated position information of the object in the picture to be marked based on the position information of the second previous picture and the position offset;

marking the object in the picture to be marked based on the estimated position information.

In the embodiment of the present disclosure, a position offset of the object can be determined by using position information of the object in two adjacent pictures, estimated position information of the object in the picture to be marked can be determined based on the position information of the second previous picture and the position offset, and the object in the picture to be marked can be marked based on the estimated position information, thereby avoiding marking each object in the picture through human memory, which can speed up the marking of the same object in multiple pictures.

In addition, it is easy for marking person to make human errors when marking the same object by memory. For example, for an object that has entered an imaging range for many times, the possibility of error will increase a lot under different marking requirements. For example, when the same object is required to enter the imaging range for many times, the same ID is used. In the embodiment of the present disclosure, marking each object in the picture through artificial memory is avoided, and the accuracy of marking can also be improved.

Figure 3:
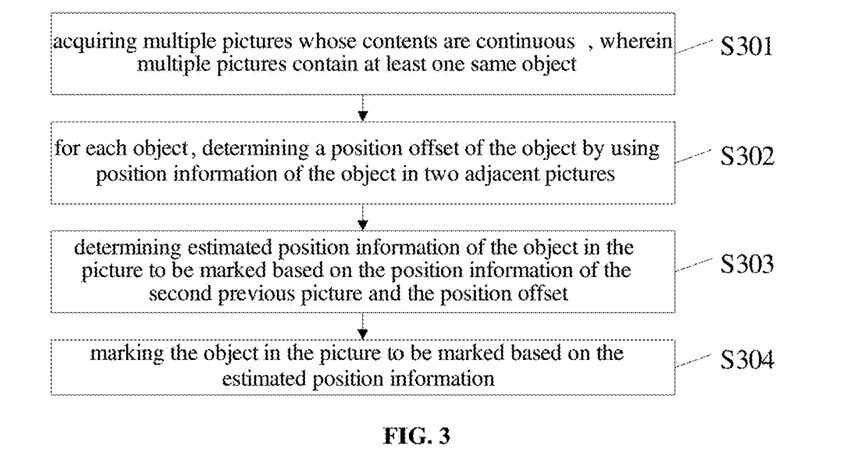
FIG. 3 is a flow diagram of a data marking method according to an embodiment of the present disclosure.

FIG. 3 is a flow diagram of a data marking method according to an embodiment of the present disclosure. Referring to FIG. 3, the data marking method according to the embodiment of the present disclosure may include:

S301, acquiring multiple pictures whose contents are continuous.

The multiple pictures contain at least one same object.

The object may also be understood as an object in a picture, such as a ship, a vehicle, etc.

The continuous content refers to the content in multiple pictures being continuous. Specifically, the multiple pictures whose contents are continuous may be continuous frames in a video, or multiple pictures sorted in chronological order, such as multiple pictures acquired by performing frame extraction on the video data, and so on.

In one implementation, pictures collected by an image acquisition device can be received in real time, and multiple pictures whose contents are continuous are continuous frames collected by the image acquisition device in real time. Wherein the image acquisition device may include a video camera, a camera, and the like.

In another implementation, multiple pictures sorted in chronological order corresponding to the stored video data can be acquired from a database, all frames in the video data can be acquired as the multiple pictures whose contents are continuous, or some frames in the video can be acquired as the multiple pictures whose contents are continuous. For example, after collecting device data, the image acquisition device can store the video data to the database firstly, and then perform frame extraction on the video data and sort the video data to acquire multiple pictures sorted in chronological order corresponding to the video data, and store the multiple pictures sorted in chronological order corresponding to the video data to the database.

S302, for each object, determining a position offset of the object by using position information of the object in two adjacent pictures.

Wherein the two adjacent pictures include a first previous picture and a second previous picture, the second previous picture is a picture before and adjacent to a picture to be marked in time sequence; the first previous picture is a picture before and adjacent to the second previous picture in time sequence.

In one implementation, the position offset can be obtained by subtracting the position information of the object in the first previous picture from the position information of the object in the second previous picture.

In another implementation, the position offset can be obtained by subtracting the position information of the object in the second previous picture from the position information of the object in the first previous picture.

S303, determining estimated position information of the object in the picture to be marked based on the position information of the second previous picture and the position offset.

In general, the position change of the same object in multiple pictures whose contents are continuous (such as continuous frames in a video) is regular. For example, the change of the position of a same object in a picture relative to the position of the same object in the second previous picture having continuous content with the picture can be understood as change 1, and the change of the position of the object in the next first picture having continuous content with the picture relative to the position of the object in the picture can be understood as change 2, the difference between change 1 and change 2 is generally small, or even the same. In the embodiment of the present disclosure, the estimated position information of a same object in a picture to be marked can be determined by using the position information of the same object in two adjacent pictures. It is simply understood that the position information of a same object in a picture to be marked can be estimated by using the position information of the same object in two adjacent pictures.

In one implementation, if the position offset is obtained by subtracting the position information of the object in the second previous picture from the position information of the object in the first previous picture, S303 may include: obtaining the estimated position information of the object in the picture to be marked by adding the position information of the object in the second previous picture to the position offset, which can also be understood as adding the position offset to the position information of the object in the second previous picture.

In one implementation, if the position offset is obtained by subtracting the position information of the object in the second previous picture from the position information of the object in the first previous picture, S303 may include: obtaining the estimated position information of the object in the picture to be marked by subtracting the position offset from the position information of the object in the second previous picture, which can also be understood as subtracting the position offset from the position information of the object in the second previous picture.

The picture to be marked may include other pictures except the first picture and the second picture among multiple pictures whose contents are continuous.

First, the first picture and the second picture sorted in chronological order among multiple pictures are marked, and the position information of the object in the first picture and the second picture is used as the basis for subsequent marking. That is, it can be understood that the position information of each object in the subsequent pictures is estimated on the basis of the position information of the object in the first picture and the second picture.

It is easy to understand that two adjacent pictures are used to estimate the position of the next picture. For example, for five pictures with time sequence, the five pictures can be continuous frames in a video, such as a clip in a video; or the five pictures can be the pictures extracted and sorted from the video. First, the first picture and the second picture are marked. Specifically, the position of each object in the first picture is marked and the identifier of the object is marked at the position of each object. Then, each object in the second picture is marked with the same identifier as in the first picture, and the position of each object in the second picture is marked. Then, for each object, the position of the object in the third picture is estimated by using the first picture and the second picture, that is, the position offset of the object is determined by using the position information of the object in the first picture and the second picture, coordinates of the object in the first picture are subtracted from coordinates of the object in the second picture to obtain a coordinate difference which can be understood as the position offset, the position information of the second picture is added to the position offset to obtain the position information of the object in the third picture. Similarly, the position of the object in the fourth picture is estimated by using the second picture and the third picture, that is, the position offset of the object is determined by using the position information of the object in the second picture and the third picture, coordinates of the object in the second picture are subtracted from coordinates of the object in the third picture to obtain a coordinate difference which can be understood as the position offset, the position information of the third picture is added to the position offset to obtain the position information of the object in the fourth picture. The position of the object in the fifth picture is estimated by using the third picture and the fourth picture, that is, the position offset of the object is determined by using the position information of the object in the third picture and the fourth picture, coordinates of the object in the third picture are subtracted from coordinates of the object in the fourth picture to obtain a coordinate difference which can be understood as the position offset, the position information of the fourth picture is added to the position offset to obtain the position information of the object in the fifth picture.

It can be understood that the five pictures here are just to illustrate the process of estimating the position of a picture to be marked based on adjacent pictures. In the actual application process, the number of pictures may be more.

S304, marking the object in the picture to be marked based on the estimated position information.

In one implementation, the estimated position information can be directly marked in the picture to be marked, and the identifier of the object can be marked at the position determined based on the estimated position information. In one implementation, the position of the estimated position information can be understood as the position of the object in the picture to be marked, and the identifier of the object can be marked at this position. In this way, the marking of the object in the picture to be marked is completed. In another implementation, the estimated position information is coordinates, which can be used as a center point of a rectangle, and a rectangle can be drawn from this center point. The rectangle can be understood as a rectangular box for the object, the identifier of the object can be marked at the position of the rectangular box, for example, the identifier of the object can be marked on the left side of the rectangular box.

This manner avoids the difficulty of manually memorizing the identifier and position of each object, which can improve the speed of marking, and avoids errors caused by manually memorizing the identifier and position of each object, which can improve the accuracy of marking.

In another implementation, the estimated position information can be displayed, so that the marking person can correct the estimated position information and input the corrected estimated position information. In this way, the corrected estimated position information can be received, and the corrected estimated position information can be marked in the picture to be marked. The corrected estimated position information is marked in the picture to be marked, and the identifier of the object is marked at the position determined based on the corrected estimated position information. In one implementation, the corrected estimated position information can be understood as the position of the object in the picture to be marked, and the identifier of the object can be marked at this position. In this way, the marking of the object in the picture to be marked is completed. In another implementation, the corrected estimated position information is taken as the center point of the rectangle, and a rectangle is drawn from the center point. The rectangle can be understood as a rectangular box for the object, and the identifier of the object can be marked at the position of the rectangular box, for example, the identifier of the object is marked on the left side of the rectangular box.

This manner avoids marking each object in a picture through human memory, which can improve the speed of marking. In addition, in the process of marking, the marking person can record the positions of the same object in adjacent pictures only by a small amount of correction of the estimated positions, which greatly reduces the difficulty of the marking person memorizing ID, reduces the impact of human memory on the efficiency and accuracy of marking, and improves the speed and accuracy of marking. In addition, the accuracy of marking can be further improved by correcting the obtained estimated position information.

In an optional embodiment, acquiring multiple pictures whose contents are continuous can include acquiring multiple pictures sorted in chronological order corresponding to each of at least one piece of video data.

For one piece of video data, the multiple pictures sorted in chronological order corresponding to the video data are acquired by performing frame extraction on the video data and sorting pictures acquired through the frame extraction corresponding to the video data in chronological order.

Multiple pictures sorted in chronological order can be understood as multiple pictures whose contents are continuous, that is, multiple pictures whose contents are continuous respectively corresponding to different video data can be marked. The efficiency of continuous marking for the same object in continuous images in video marking can be improved.

In one implementation, the multiple pictures sorted in chronological order respectively corresponding to the video data can be acquired by an electronic device performing frame extraction on the video data and sorting pictures acquired through the frame extraction corresponding to the video data in chronological order.

Figure 4:
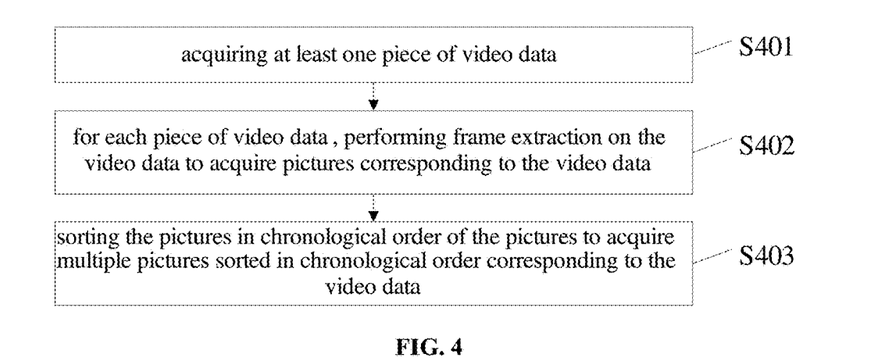
FIG. 4 is a flow diagram of determining multiple pictures sorted in chronological order corresponding to video data in an embodiment of the present disclosure.

As shown in FIG. 4, the data marking method according to the embodiment of the present disclosure may include:

S401, acquiring at least one piece of video data.

The video data collected by an image acquisition device can be acquired, for example, a camera has multiple camera lenses, the video data collected respectively by the multiple camera lenses can be acquired; or, the video data collected by a camera lens in different time periods is acquired respectively. The video data collected by at least two image acquisition devices can also be acquired respectively.

In the embodiment of the present disclosure, the electronic device can directly acquire video data from the image acquisition device, or the image acquisition device stores the collected video data to a database, from which the electronic device acquires video data, and so on.

In one implementation, at least two camera lenses are used to collect data respectively, and the data acquired by the camera lenses are numbered. Each camera lens has a unique identification code, which is used to distinguish the data acquired by different cameras. For example, all data acquired from camera lens 1 has a data file name with a prefix of "001-", and data acquired from camera lens 2 has a data file name with a prefix of "002-", and so forth.

The data collected by the camera can be stored in a data file package. The data file name of the data file includes an identification code corresponding to the camera lens, which is used to identify which camera lens collects the data stored in the data file.

In one implementation, the data acquired by different camera lenses can be stored respectively in different data files, that is, all the data collected by one camera lens can be stored in one data file. For each data file, the data file name of the data file includes the identification code used to identify the camera lens corresponding to the data stored in the data file. In this way, video data acquired by different image acquisition devices can be easily obtained from different data files.

S402, for each piece of video data, performing frame extraction on the video data to acquire pictures corresponding to the video data.

In the embodiments of the present disclosure, the frame extraction method is not limited, which can be selected according to the actual situation. For example, frame extraction can be performed on the whole video data by extracting one frame of image every preset time interval, wherein the preset time interval can be determined according to actual requirements or experiences, for example, extracting one frame of image every 1 second, which can also be understood as an interval of 1 second between two extractions of adjacent frames. Alternatively, one frame of image can be extracted from each clip of every preset time range in the video. For example, one frame of image can be extracted from each clip of every one second in the video, the extracted frame of image can be any one frame of image in the clip of one second.

The picture acquired through frame extraction may include a time identifier. For example, in the process of collecting data by the camera, the shooting time of each frame of image can be recorded, and the time identifier can represent the shooting time.

Alternatively, the time identifier can represent offset time, which refers to the offset time of the extracted frame of image relative to a certain frame of image. The frame of image can be any frame of image in the video data, for example, it can be a first frame of image extracted.

The embodiments of the present disclosure do not limit the time identifier in the pictures acquired through frame extraction, as long as the same group of pictures adopt the time identifier of the same type of time, for example, the time representations of all pictures acquired through frame extraction for one piece of video data are used to identify the shooting time, or are used to identify the offset time.

In the embodiment of the present disclosure, pictures corresponding to video data acquired through frame extraction are stored. Wherein, the picture can be named with the identifier of video data and the time identifier of the picture. For example, the prefix of the video data file name (identifying the image acquisition device that generates video data, such as a camera) is reserved as the prefix of the file name of the image data file. The image data file name consists of: the video data prefix+the timestamp of the time when the frame is generated. The video data prefix is the prefix of the data file name of the data file that stores video data, and the timestamp of the time when the frame is generated is the above time identifier.

In one case, it is possible to extract multiple frames of images from the same second of video in the process of frame extraction. In this case, if the time identified by the time identifier is in a unit of second, the multiple frames cannot be distinguished. Therefore, in this case, the time identified by the time identifier can be in a unit of millisecond, that is, the millisecond field can be added to the timestamp of the time when the frame is generated during the naming process of the picture.

S403, sorting the pictures in chronological order of the pictures to acquire multiple pictures sorted in chronological order corresponding to the video data.

Based on the time identifiers of pictures, pictures acquired by performing frame extraction on each piece of video data can be sorted in chronological order. For example, the chronological order means that pictures with earlier time are sorted first, and pictures with later time are sorted last. In this way, multiple pictures sorted in chronological order corresponding to each piece of video data can be acquired.

The multiple pictures acquired through frame extraction are sorted in the order of natural passage of time, which can make the multiple pictures have continuity. Each picture will have continuity with the previous and next pictures in terms of picture content, the multiple pictures sorted in chronological order can be understood as multiple pictures whose contents are continuous.

The data generated by different camera lenses can be grouped, and each group stores image data generated by the same camera lens. For example, the multiple pictures sorted in chronological order respectively corresponding to the video data acquired by different camera lenses are stored separately. For example, there are three pieces of video data collected by three camera lenses. In this way, three groups of pictures sorted in chronological order can be acquired from three pieces of video data, and these three groups of pictures can be stored separately.

In this way, acquiring multiple pictures whose contents are continuous can include acquiring multiple pictures sorted in chronological order. The multiple pictures whose contents are continuous may include the multiple pictures sorted in chronological order described above.

After acquiring the video data in the embodiments of the present disclosure, frame extraction can be performed on the video data first, and then the pictures acquired through frame extraction can be sorted in chronological order. The sorted multiple pictures can be understood as multiple pictures whose contents are continuous. Specifically, for each piece of video data in multiple pieces of video data, corresponding multiple pictures whose contents are continuous can be acquired respectively, and the above steps S302 to S304 can be performed for the multiple pictures whose contents are continuous respectively corresponding to different video data, so as to mark the multiple pictures whose contents are continuous respectively corresponding to different video data.

In the embodiment of the present disclosure, video data taken by different cameras can be acquired. Frame extraction is performed on the video data taken by each camera lens, so that the image data corresponding to different camera lenses can be acquired. The image data includes the camera lens identifier and time identifier of each image. In this way, in the process of marking, the multiple pictures sorted in chronological order can be acquired, the object in the first previous picture is marked (the object identifier and position of each object is marked), and for each object, estimating the positions of the same object in subsequent pictures specifically includes: for each picture, calculating a difference between the positions of an object in this picture and in a picture previous to this picture, to obtain the position offset of the object, adding the position offset to the position of the object in this picture, to obtain the position of the object in a next picture, and marking the object in the next picture based on this position. Before marking the object based on the estimated position, the estimated position can also be corrected.

In another implementation, multiple pictures sorted in chronological order corresponding to each of at least one piece of video data can be acquired by an electronic device from a database such as a marking system database, while the multiple pictures sorted in chronological order corresponding to each piece of video data are stored in the marking system database by the video data processing system.

Processing each piece of video data to acquire multiple pictures sorted in chronological order corresponding to each piece of video data may include:

For each piece of video data, performing frame extraction on the video data to acquire pictures corresponding to the video data; sorting the pictures in chronological order to acquire multiple pictures sorted in chronological order corresponding to the video data.

Specifically, the video data processing system executes the above S401 to S403 to acquire multiple pictures sorted in chronological order corresponding to each piece of video data, and stores the multiple pictures sorted in chronological order corresponding to each piece of video data in the marking system database. In this way, during the marking process, the multiple pictures sorted in chronological order corresponding to each of at least one piece of video data can be acquired from the marking system database.

The video data is processed by the video data processing system to acquire multiple pictures sorted in chronological order, and multiple pictures sorted in chronological order corresponding to each of multiple pieces of video data are stored in the marking system database. During the marking process, these pictures sorted in chronological order can be directly acquired from the marking system database for marking, which can save the processing pressure of an electronic device during the marking process, and save computing resources of the electronic device, etc.

Figure 5:
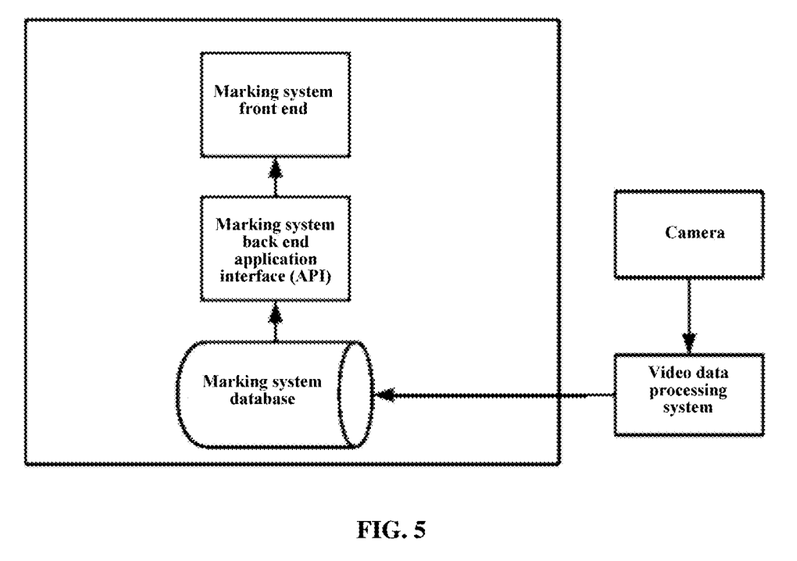
FIG. 5 is a schematic diagram of system interaction in an embodiment of the present disclosure.

As shown in FIG. 5, multiple camera lenses collect data respectively to acquire video data corresponding to each of the multiple camera lenses. After each camera lens acquires the video data, it can send the video data of the camera lens to the video data processing system. The video data processing system processes each piece of video data to acquire multiple pictures sorted in chronological order corresponding to each piece of video data, and stores the multiple pictures sorted in chronological order corresponding to each piece of video data in the marking system database. Wherein, the multiple pictures sorted in chronological order can also be understood as pictures whose contents are continuous.

A marking system back end can acquire these pictures whose contents are continuous from the marking system database through an application programming interface (API), and mark these pictures whose contents are continuous. A marking system front end displays the marked pictures.

The marking system back end and the marking system front end may be two parts in one electronic device, or may be two independent electronic devices, etc.

The marking system back end acquires pictures whose contents are continuous and marks these pictures whose contents are continuous, which can include:
  acquiring multiple pictures whose contents are continuous, wherein the multiple pictures contain at least one same object; for each object, determining a position offset of the object by using position information of the object in two adjacent pictures, wherein the two adjacent pictures include a first previous picture and a second previous picture, the second previous picture is a picture before and adjacent to a picture to be marked in time sequence; the first previous picture is a picture before and adjacent to the second previous picture in time sequence; determining estimated position information of the object in the picture to be marked based on the position information of the second previous picture and the position offset; marking the object in the picture to be marked based on the estimated position information. The specific process has been detailed in the above embodiments.

Figure 6:
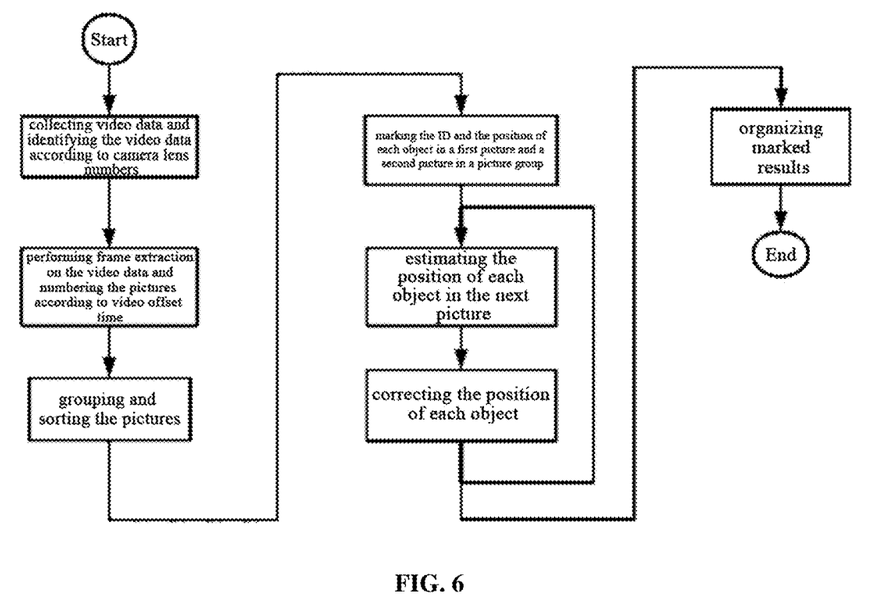
FIG. 6 is a schematic diagram with the application of a data marking method according to an embodiment of the present disclosure.

In one specific example, as shown in FIG. 6, the data marking method according to the embodiment of the present disclosure may include:
  step A, collecting video data and identifying the video data according to camera lens numbers.

Multiple camera lenses collect video data respectively, and the video data collected by different camera lenses are identified according to camera lens numbers.

Each camera lens can have a unique identification code, which is used to distinguish the video data acquired by different camera lenses. For example, the video data acquired by camera lens 1 all has a data file name with a prefix of "001-", that is, the video data acquired by camera lens 1 is stored in a data file whose data file name has a prefix of "001-"; the data acquired by the camera lens 2 has a data file name with a prefix of "002-", that is, the video data acquired by the camera lens 2 is stored in another data file whose data file name has a prefix of "002-", and so forth. The video data acquired by different camera lenses is respectively stored in different data files, and is distinguished by different data file names.

Step B, performing frame extraction on the video data and numbering the pictures according to video offset time.

After the video data is acquired in the embodiment of the present disclosure, the video data can be processed first, that is, frame extraction is performed on the video data first.

The video data can be stored in video data files, and the video data can be acquired respectively from each video data file, and the video data can be processed.

Numbering pictures according to offset time can also be understood as identifying, in each picture acquired through the frame extraction, the offset time of this picture. The offset time may be offset time of the extracted frame of image relative to a certain frame of image. The frame of image can be any frame of image in the video data, for example, it can be the first frame of image extracted.

In one example, frame extraction is performed on all video data in the manner of extracting one frame of picture per second of video, and the offset time of each picture is calculated at the same time, the offset time can be accurate to milliseconds, and the offset time is stored as the creation time of the picture. The picture can be stored in a database, for example, it can be stored in an image data file in the database.

In the process of storing the picture, in addition to storing the offset time, the prefix of the video data file name can also be reserved as the prefix of the file name of the image data file. Image data file name consists of: original prefix (prefix of video data file name)+timestamp of time when the frame is generated (time identifier such as shooting time, offset time, etc.)+number of milliseconds. It can also be understood that the image data file name consists of: video data prefix+timestamp of time when the frame is generated, the video data prefix is the prefix of the data file name of the data file storing the video data, and the timestamp of the time when the frame is generated is the above time identifier. The time identified by the time identifier can be in a unit of milliseconds, that is, a millisecond field can be added to the timestamp of time when the frame is generated during the naming process of the picture. The number of milliseconds is added to consider the case where multiple images are extracted from one second of video in some frame extraction methods.

Step C, grouping and sorting the pictures.

The image data generated by different camera lenses can be grouped, and each group stores image data generated by the same camera lens. Wherein, the image data generated by each camera lens is multiple pictures acquired by performing frame extraction on the video data of the camera lens.

Since each picture has a time attribute, that is, each picture is marked with a time identifier, the data in the same group, that is, multiple pictures, are sorted according to the time identifier of the picture, for the purpose of the continuity of multiple pictures, so that pictures are arranged in the order of natural passage of time. In this way, each picture will have continuity in the picture content with the previous picture and the next picture.

In one implementation, after each camera lens acquires the video data, it can send the video data of the camera lens to the video data processing system. The video data processing system processes each piece of video data respectively. Specifically, the video data processing system identifies the video data according to camera lens numbers; performs frame extraction on the video data, and numbers the pictures according to video offset time; groups and sorts the pictures, and thus acquires multiple pictures sorted in chronological order corresponding to each piece of video data.

In addition, the multiple pictures sorted in chronological order corresponding to each piece of video data may be stored in a marking system database.

Step D, marking the ID and the position of each object in a first picture and a second picture in a picture group.

Step E, estimating the position of each object in the next picture.

Multiple pictures sorted in chronological order corresponding to at least one piece of video data may be obtained from the marking system database, for example, multiple groups of pictures corresponding to each of multiple camera lenses may be acquired. For example, the marking system back end acquires multiple pictures sorted in chronological order corresponding to at least one piece of video data from the marking system database.

For each group of sorted pictures, an object(s) in the first picture and the second picture in this group of pictures is/are marked, and the ID and coordinates of each object are recorded. The ID is the unique identifier of the object, and the coordinates are the position of the object in the picture.

The positions of objects in the remaining pictures in this group of pictures (pictures other than the first picture and the second picture) are sequentially estimated. The estimation method is to calculate the position offset between objects with the same ID in two adjacent pictures, such as calculate the difference in positions (which can be coordinates) of two adjacent pictures, and for each object, the coordinates of the object in the next picture is calculated by adding the current position of the object in the picture to the position offset of the object.

The difference between the position of an object in the picture and the position of the same object in a picture previous to this picture, to obtain the position offset of the object, adding the position offset to the position of the object in this picture, to obtain the position of the object in the next picture.

Step F, correcting the position of each object.

After obtaining the estimated position information of each object in the next picture, the estimated position information can be directly marked in the picture to be marked, and the identifier of the object can be marked at a position determined based on the estimated position information.

Alternatively, the estimated position information can also be displayed, so that the marking person can correct the estimated position information and input the corrected estimated position information. In this way, the corrected estimated position information can be received, and the corrected estimated position information can be marked in the picture to be marked. The corrected estimated position information is marked in the picture to be marked, and the identifier of the object is marked at the position determined based on the corrected estimated position information.

In addition, in the process of marking, the marking person can record the positions of the same object in adjacent pictures only by a small amount of coordinate correction of the estimated position, which greatly reduces the difficulty of the marking person memorizing ID, and improves the accuracy of marking.

Step G, organizing marked results.

The marked results are sorted by file name and delivered. The file name is the above image data file name.

The image data generated by each camera lens is a group of pictures, that is, multiple pictures sorted in chronological order acquired from the video data of each camera lens can be understood as a group of pictures. Multiple groups of pictures corresponding to multiple camera lenses are marked respectively to acquire multiple groups of marked pictures.

After marking is completed, the marked result can also be displayed, specifically, the identifier and position of each object marked in each picture can be displayed. For example, the marking system front end displays each marked picture.

The embodiment of the present disclosure can realize the marking of the same object on the continuous pictures in a video, improve the speed of the marking of the same object on the continuous pictures in the video, improve the accuracy of the marking, and make the marking process not limited by the quality of the marking person.

Figure 7:
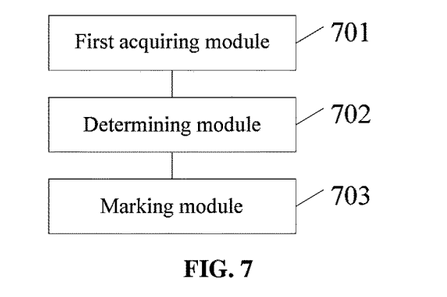
FIG. 7 is a schematic structural diagram of a data marking apparatus according to an embodiment of the present disclosure.

An embodiment of the disclosure also provides a data marking apparatus, as shown in FIG. 7, which can include:
  a first acquiring module 701, configured for acquiring multiple pictures whose contents are continuous, wherein the multiple pictures contain at least one same object;
  a determining module 702, configured for: for each object, determining a position offset of the object by using position information of the object in two adjacent pictures, wherein the two adjacent pictures include a first previous picture and a second previous picture, the second previous picture is a picture before and adjacent to a picture to be marked in time sequence; the first previous picture is a picture before and adjacent to the second previous picture in time sequence; determining estimated position information of the object in the picture to be marked based on the position information of the second previous picture and the position offset;
  a marking module 703, configured for marking the object in the picture to be marked based on the estimated position information.

Optionally, the first acquiring module 701 is specifically configured for acquiring multiple pictures sorted in chronological order corresponding to each of at least one piece of video data; wherein for one piece of video data, the multiple pictures sorted in chronological order corresponding to the video data are acquired by performing frame extraction on the video data and sorting pictures acquired through the frame extraction corresponding to the video data in chronological order of the pictures.

Figure 8:
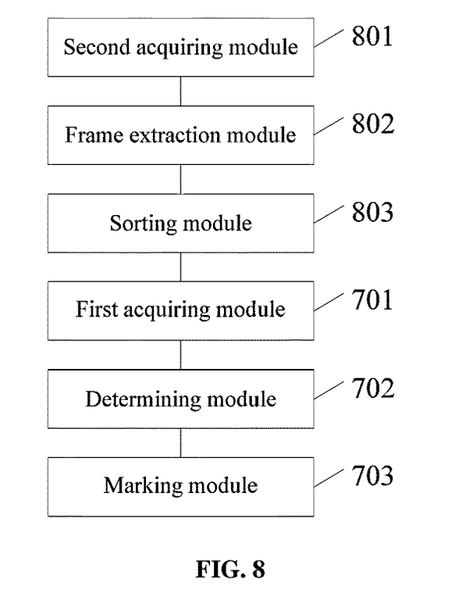
FIG. 8 is another schematic structural diagram of a data marking apparatus according to an embodiment of the present disclosure.

Optionally, as shown in FIG. 8, the apparatus further includes:
  a second acquiring module 801, configured for acquiring at least one piece of video data;
  a frame extraction module 802, configured for performing, for each piece of video data, frame extraction on the video data to acquire pictures corresponding to the video data;
  a sorting module 803, configured for sorting the pictures in chronological order of the pictures to acquire multiple pictures sorted in chronological order corresponding to the video data.

Optionally, the first acquiring module 701 is specifically configured for acquiring multiple pictures sorted in chronological order corresponding to each of at least one piece of video data from a marking system database, wherein the multiple pictures sorted in chronological order corresponding to each of at least one piece of video data are stored in the marking system database by a video data processing system, the multiple pictures sorted in chronological order corresponding to each of at least one piece of video data are acquired by the video data processing system performing the frame extraction on the each piece of video data and sorting pictures acquired through the frame extraction corresponding to the video data in chronological order of the pictures.

Figure 9:
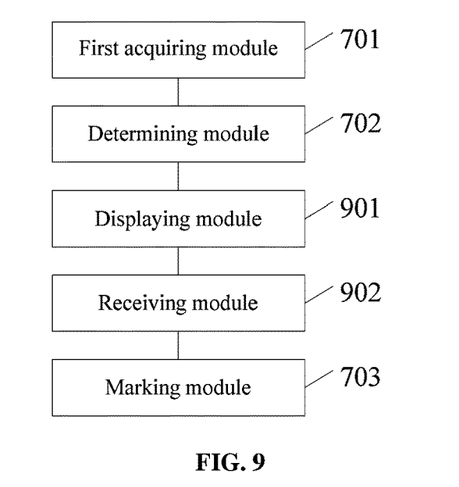
FIG. 9 is another schematic structural diagram of a data marking apparatus according to an embodiment of the present disclosure.

Optionally, as shown in FIG. 9, the apparatus further includes:
- a displaying module 901, configured for displaying the estimated position information;
- a receiving module 902, configured for receiving corrected estimated position information obtained by correcting the estimated position information;
- wherein the marking module 703 is specifically configured for marking the corrected estimated position information in the picture to be marked, and marking an identifier of the object at a position determined based on the corrected estimated position information.

Figure 10:
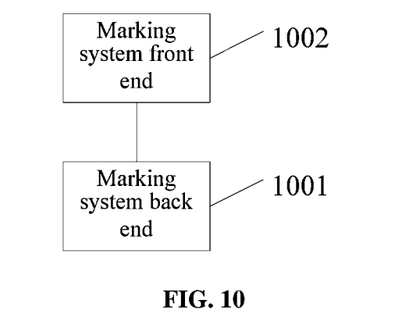
FIG. 10 is a schematic structural diagram of a data marking system according to an embodiment of the present disclosure.

An embodiment of the present disclosure also provides a data marking system, as shown in FIG. 10, which may include: a marking system back end 1001 and a marking system front end 1002;
- the marking system back end 1001 is configured for acquiring multiple pictures whose contents are continuous, wherein the multiple pictures contain at least one same object; for each object, determining a position offset of the object by using position information of the object in two adjacent pictures, wherein the two adjacent pictures include a first previous picture and a second previous picture, the second previous picture is a picture before and adjacent to a picture to be marked in time sequence; the first previous picture is a picture before and adjacent to the second previous picture in time sequence; determining estimated position information of the object in the picture to be marked based on the position information of the second previous picture and the position offset; marking the object in the picture to be marked based on the estimated position information;
- the marking system front end 1002 is configured for displaying the marking of the object in the image to be marked by the marking system back end 1001.

Figure 11:
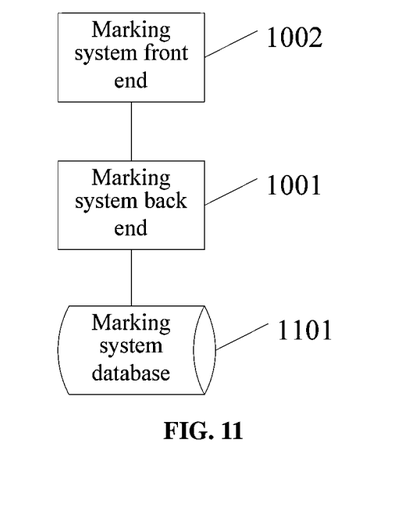
FIG. 11 is another schematic structural diagram of a data marking system according to an embodiment of the present disclosure.

Optionally, as shown in FIG. 11, the data marking system may further include: a marking system database 1101;
- the marking system back end 1001 is specifically configured for acquiring multiple pictures sorted in chronological order corresponding to each of at least one piece of video data from the marking system database; wherein for one piece of video data, the multiple pictures sorted in chronological order corresponding to the video data are acquired by performing frame extraction on the video data and sorting pictures acquired through the frame extraction corresponding to the video data in chronological order of the pictures.

Optionally, the multiple pictures sorted in chronological order corresponding to each of the at least one piece of video data are stored in the marking system database 1101 by a video data processing system, the multiple pictures sorted in chronological order corresponding to each of at least one piece of video data are acquired by the video data processing system performing the frame extraction on the each piece of video data and sorting pictures acquired through the frame extraction corresponding to the video data in chronological order of the pictures.

Optionally, the marking system back end 1001 is configured for displaying the estimated position information; receiving corrected estimated position information obtained by correcting the estimated position information; marking the corrected estimated position information in the picture to be marked, and marking an identifier of the object at a position determined based on the corrected estimated position information.

For embodiments of the apparatus and the system, since they are similar to embodiments of the method, the description thereof is relatively simple. The relating parts could refer to the parts of the description of the embodiments of the method.

The collection, storage, use, processing, transmission, provision and disclosure of the user's personal information involved in the technical solution of this disclosure comply with the provisions of relevant laws and regulations, and do not violate the public order and good customs.

According to embodiments of the present disclosure, the present disclosure also provides an electronic device, a readable storage medium and a computer program product.

Figure 12:
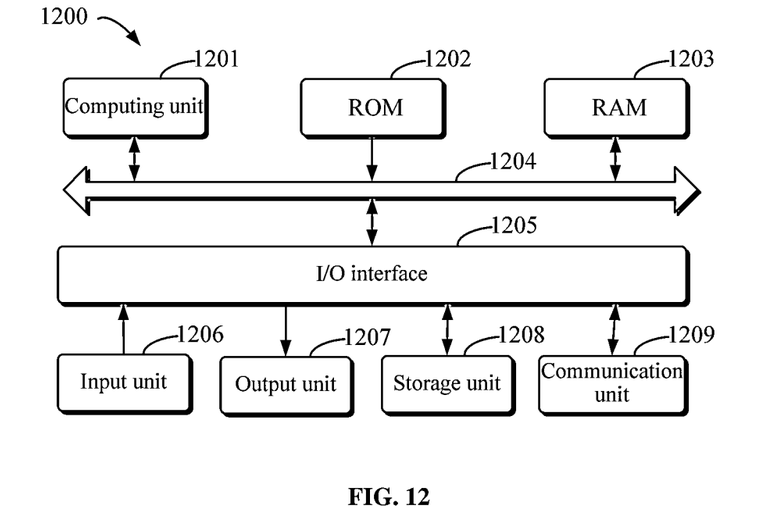
FIG. 12 is a block diagram of an electronic device for implementing a data marking method according to an embodiment of the present disclosure.

FIG. 12 shows a schematic block diagram of an electronic device for implementing a data marking method according to an embodiment of the present disclosure. The electronic device is used to represent various forms of digital computers, such as laptops, desktops, workstations, personal digital assistants, servers, blade servers, mainframe computers, and other suitable computers. The electronic device may also represent various forms of mobile apparatuses, such as personal digital processing, cellular phones, smart phones, wearable devices, and other similar computing apparatus. The components, their connections and relationships, and their functions shown herein are only examples, and are not intended to limit the implementation of the present disclosure described herein and/or required herein.

As shown in FIG. 12, the device 1200 includes a computing unit 1201, which can perform various appropriate actions and processing according to a computer program stored in a read-only memory (ROM) 1202 or a computer program loaded from a storage unit 1208 into a random access memory (RAM) 1203. In RAM 1203, various programs and data required for the operation of the device 1200 can also be stored. The computing unit 1201, ROM 1202 and RAM 1203 are connected to each other through a bus 1204. The input/output (I/O) interface 1205 is also connected to the bus 1204.

Multiple components in the device 1200 are connected to the I/O interface 1205, including: an input unit 1206, such as a keyboard, a mouse, etc.; an output unit 1207, such as various types of displays, speakers, etc.; a storage unit 1208, such as a magnetic disk, an optical disk, etc.; and a communication unit 1209, such as a network card, a modem, a wireless communication transceiver, etc. The communication unit 1209 allows the device 1200 to exchange information/data with other devices through a computer network such as the internet and/or various telecommunication networks.

The computing unit 1201 may be various general-purpose and/or dedicated processing components with processing and computing capabilities. Some examples of the computing unit 1201 include, but are not limited to, a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, etc. The computing unit 1201 performs various methods and processes described above, such as a data marking method. For example, in some embodiments, the data marking method can be implemented as a computer software program, which is tangibly included in a machine-readable medium, such as a storage unit 1208. In some embodiments, part or all of the computer program can be loaded and/or installed on the device 1200 via the ROM 1202 and/or the communication unit 1209. When a computer program is loaded into the RAM 1203 and executed by the computing unit 1201, one or more steps of the data marking method described above may be performed. Alternatively, in other embodiments, the computing unit 1201 may be configured to perform the data marking method by any other suitable means (e.g., by means of firmware).

Various embodiments of the systems and technologies described above in this document can be implemented in digital electronic circuit systems, integrated circuit systems, field programmable gate arrays (FPGAs), application specific integrated circuits (ASICs), application specific standard products (ASSPs), system on chip (SOC), complex programmable logic devices (CPLDs), computer hardware, firmware, software, and/or their combinations. These various embodiments can include: implementing in one or more computer programs, which can be executed and/or interpreted on a programmable system including at least one programmable processor, the programmable processor can be a dedicated or general programmable processor, and can receive data and instructions from a storage system, at least one input device, and at least one output device, and transmit data and instructions to the storage system, the at least one input device, and the at least one output device.

The program code for implementing the methods of the present disclosure may be written in any combination of one or more programming languages. These program codes can be provided to a processor or controller of a general purpose computer, a special purpose computer or other programmable data processing device, so that when the program codes are executed by a processor or controller, the functions/operations specified in the flow chart and/or block diagram are implemented. The program codes can be executed completely on the machine, partially on the machine, partially on the machine as an independent software package and partially on a remote machine or completely on a remote machine or server.

In the context of the present disclosure, a machine-readable medium may be a tangible medium, which may contain or store programs for use by or in combination with an instruction execution system, apparatus or device. The machine-readable medium may be a machine-readable signal medium or a machine-readable storage medium. The machine-readable media may include, but is not limited to, an electronic, magnetic, optical, electromagnetic, infrared, or semiconductor system, apparatus, or device, or any suitable combination of the above. A more specific example of the machine-readable storage medium would include an electrical connection based on one or more lines, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

In order to provide interaction with the user, the system and technology described herein can be implemented on a computer with: a display apparatus (such as a CRT (cathode ray tube) or LCD (liquid crystal display) monitor) for displaying information to the user; and a keyboard and a pointing apparatus (for example, a mouse or a trackball) through which the user can provide an input to a computer. Other types of apparatus can also be used to provide interaction with users; for example, the feedback provided to the user may be any form of sensor feedback (for example, visual feedback, auditory feedback, or haptic feedback); and the input from the user can be received in any form (including sound input, voice input or haptic input).

The systems and technologies described herein can be implemented in a computing system including background components (e.g., as a data server), or a computing system including middleware components (e.g., an application server) or a computing system including front end components (for example, a user computer with a graphical user interface or a web browser through which a user can interact with the implementation of the system and technology described herein), or a computing system including any combination of such back end components, middleware components, or front end components. The components of the system may be interconnected by digital data communication (e.g., a communication network) in any form or medium. Examples of communication networks include local area networks (LANs), wide area networks (WANs), and Internet.

The computer system may include a client and a server. The client and server are generally far away from each other and usually interact through the communication network. The relationship between the client and the server is generated by a computer program running on a corresponding computer and having a client-server relationship with each other. The server may be a cloud server, may also be a server of a distributed system, or a server combined with a blockchain.

It should be understood that steps may be resorted, added or deleted using the various forms of flow shown above. For example, each step described in the present disclosure may be executed in parallel, sequentially, or in a different order, as long as the desired result of the technical solution disclosed in the present disclosure can be achieved, which is not limited herein.

The specific implementations described above do not limit the protection scope of the present disclosure. It should be apparent to those skilled in the art that various modifications, combinations, sub-combinations and substitutions may be made according to design requirements and other factors. Any modifications, equivalents, improvements or the like within the spirit and principle of the disclosure should be included in the scope of the disclosure.

What is claimed is:

1. A data marking method, comprising:
    acquiring multiple pictures whose contents are continuous, wherein the multiple pictures contain at least one same object;
    for each object, determining a position offset of the object by using position information of the object in two adjacent pictures, wherein the two adjacent pictures include a first previous picture and a second previous picture, the first previous picture is a picture before and adjacent to a picture to be marked in time sequence; the second previous picture is a picture before and adjacent to the first previous picture in time sequence;
    determining estimated position information of the object in the picture to be marked based on the position information of the second previous picture and the position offset;
    marking the object in the picture to be marked based on the estimated position information;
    displaying the estimated position information;
    receiving corrected estimated position information obtained by correcting the estimated position information;

wherein marking the object in the picture to be marked based on the estimated position information, comprises:
    marking the corrected estimated position information in the picture to be marked, and marking an identifier of the object at a position determined based on the corrected estimated position information, which comprises:
        taking the corrected estimated position information as the position of the object in the picture to be marked, and marking the identifier of the object at the position; or
        taking the corrected estimated position information as a center point of a rectangle, and drawing the rectangle from the center point, the rectangle being a rectangular box for the object, and marking the identifier of the object at the position of the rectangular box.

2. The method of claim 1, wherein acquiring multiple pictures whose contents are continuous comprises:
    acquiring multiple pictures sorted in chronological order corresponding to each of at least one piece of video data; wherein for one piece of video data, the multiple pictures sorted in chronological order corresponding to the video data are acquired by performing frame extraction on the video data and sorting pictures acquired through the frame extraction corresponding to the video data in chronological order of the pictures.

3. The method of claim 2, further comprising:
    acquiring the at least one piece of video data;
    for each piece of video data, performing the frame extraction on the video data to acquire the pictures corresponding to the video data;
    sorting the pictures in chronological order of the pictures to acquire the multiple pictures sorted in chronological order corresponding to the video data.

4. The method of claim 2, wherein acquiring multiple pictures sorted in chronological order corresponding to each of the at least one piece of video data comprises:
    acquiring the multiple pictures sorted in chronological order corresponding to each of the at least one piece of video data from a marking system database, wherein the multiple pictures sorted in chronological order corresponding to each of the at least one piece of video data are stored in the marking system database by a video data processing system, the multiple pictures sorted in chronological order corresponding to each of the at least one piece of video data are acquired by the video data processing system performing the frame extraction on each of the at least one piece of video data and sorting pictures acquired through the frame extraction corresponding to the video data in chronological order of the pictures.

5. An electronic device, comprising:
    at least one processor; and
    a memory in communication with the at least one processor; wherein
    the memory has stored thereon instructions executable by the at least one processor which, when executed by the at least one processor, cause the at least one processor to execute the method of claim 1.

6. A non-transitory computer-readable storage medium having stored computer instructions thereon, wherein the computer instructions are configured to cause the computer to execute the method of claim 1.

7. A data marking apparatus comprising a memory storing executable modules and a processor executes the executable modules, comprising:
    a first acquiring module, configured for acquiring multiple pictures whose contents are continuous, wherein the multiple pictures contain at least one same object;
    a determining module, configured for: for each object, determining a position offset of the object by using position information of the object in two adjacent pictures, wherein the two adjacent pictures include a first previous picture and a second previous picture, the second previous picture is a picture before and adjacent to a picture to be marked in time sequence; the first previous picture is a picture before and adjacent to the second previous picture in time sequence; determining estimated position information of the object in the picture to be marked based on the position information of the second previous picture and the position offset;
    a marking module, configured for marking the object in the picture to be marked based on the estimated position information;
    a displaying module, configured for displaying the estimated position information;
    a receiving module, configured for receiving corrected estimated position information obtained by correcting the estimated position information;
    wherein the marking module is specifically configured for marking the corrected estimated position information in the picture to be marked, and marking an identifier of the object at a position determined based on the corrected estimated position information, which comprises:
        taking the corrected estimated position information as the position of the object in the picture to be marked, and marking the identifier of the object at the position; or
        taking the corrected estimated position information as a center point of a rectangle, and drawing the rectangle from the center point, the rectangle being a rectangular box for the object, and marking the identifier of the object at the position of the rectangular box.

8. The apparatus of claim 7, wherein the first acquiring module is specifically configured for acquiring multiple pictures sorted in chronological order corresponding to each of at least one piece of video data; wherein for one piece of video data, the multiple pictures sorted in chronological order corresponding to the video data are acquired by performing frame extraction on the video data and sorting pictures acquired through the frame extraction corresponding to the video data in chronological order of the pictures.

9. The apparatus of claim 8, further comprising:
    a second acquiring module, configured for acquiring the at least one piece of video data;
    a frame extraction module, configured for performing, for each piece of video data, the frame extraction on the video data to acquire the pictures corresponding to the video data;
    a sorting module, configured for sorting the pictures in chronological order of the pictures to acquire multiple pictures sorted in chronological order corresponding to the video data.

10. The apparatus of claim 8, wherein the first acquiring module is specifically configured for acquiring the multiple pictures sorted in chronological order corresponding to each of the at least one piece of video data from a marking system database, wherein the multiple pictures sorted in chronological order respectively corresponding to the at least one piece of video data are stored in the marking system database by a video data processing system, the multiple pictures sorted in chronological order corresponding to each of the at least one piece of video data are acquired by the video data processing system performing the frame extraction on the each of the at least one piece of video data and sorting pictures acquired through the frame extraction corresponding to the video data in chronological order of the pictures.

11. A data marking system, comprising a marking system back end and a marking system front end;
   wherein the marking system back end is configured for acquiring multiple pictures whose contents are continuous, wherein the multiple pictures contain at least one same object; for each object, determining a position offset of the object by using position information of the object in two adjacent pictures, wherein the two adjacent pictures include a first previous picture and a second previous picture, the second previous picture is a picture before and adjacent to a picture to be marked in time sequence; the first previous picture is a picture before and adjacent to the second previous picture in time sequence; determining estimated position information of the object in the picture to be marked based on the position information of the second previous picture and the position offset; marking the object in the picture to be marked based on the estimated position information; displaying the estimated position information; receiving corrected estimated position information obtained by correcting the estimated position information; marking the corrected estimated position information in the picture to be marked, and marking an identifier of the object at a position determined based on the corrected estimated position information;
   wherein marking the corrected estimated position information in the picture to be marked, and marking an identifier of the object at a position determined based on the corrected estimated position information, comprising:
      taking the corrected estimated position information as the position of the object in the picture to be marked, and marking the identifier of the object at the position; or
      taking the corrected estimated position information as a center point of a rectangle, and drawing the rectangle from the center point, the rectangle being a rectangular box for the object, and marking the identifier of the object at the position of the rectangular box;
   the marking system front end is configured for displaying the marking of the object in the image to be marked by the marking system back end.

12. The system of claim 11, further comprising a marking system database;
   wherein, the marking system back end is specifically configured for acquiring multiple pictures sorted in chronological order corresponding to each of at least one piece of video data from the marking system database; wherein for one piece of video data, the multiple pictures sorted in chronological order corresponding to the video data are acquired by performing frame extraction on the video data and sorting the pictures acquired through the frame extraction corresponding to the video data in chronological order of the pictures.

13. The system of claim 12, wherein the multiple pictures sorted in chronological order corresponding to each of the at least one piece of video data are stored in the marking system database by a video data processing system, the multiple pictures sorted in chronological order corresponding to each of the at least one piece of video data are acquired by the video data processing system performing the frame extraction on the each of the at least one piece of video data and sorting the pictures acquired through the frame extraction corresponding to the video data in chronological order of the pictures.

* * * * *